US009607319B2

(12) United States Patent
Forsblom

(10) Patent No.: US 9,607,319 B2
(45) Date of Patent: Mar. 28, 2017

(54) MOTION AND GESTURE-BASED MOBILE ADVERTISING ACTIVATION

(71) Applicant: ADTILE TECHNOLOGIES INC., San Diego, CA (US)

(72) Inventor: Nils Forsblom, San Diego, CA (US)

(73) Assignee: Adtile Technologies, Inc., San Diego, CA (US)

( * ) Notice: Subject to any disclaimer, the term of this patent is extended or adjusted under 35 U.S.C. 154(b) by 122 days.

(21) Appl. No.: 14/160,257

(22) Filed: Jan. 21, 2014

(65) Prior Publication Data
US 2015/0186944 A1 Jul. 2, 2015

Related U.S. Application Data

(60) Provisional application No. 61/921,819, filed on Dec. 30, 2013.

(51) Int. Cl.
G06Q 30/02 (2012.01)
G06F 3/01 (2006.01)

(52) U.S. Cl.
CPC ......... *G06Q 30/0267* (2013.01); *G06F 3/011* (2013.01); *G06F 3/017* (2013.01); *G06Q 30/0252* (2013.01)

(58) Field of Classification Search
CPC .................................. G06Q 30/0207–30/0277
USPC ....................................................... 705/14.64
See application file for complete search history.

(56) References Cited

U.S. PATENT DOCUMENTS

| 7,379,566 | B2 * | 5/2008 | Hildreth | G06F 1/1686 |
| | | | | 348/208.1 |
| 7,389,591 | B2 * | 6/2008 | Jaiswal | G06F 1/1626 |
| | | | | 33/366.11 |
| 8,631,358 | B2 | 1/2014 | Louch | |
| 9,299,092 | B1 * | 3/2016 | Brown | G06Q 30/0275 |
| 2007/0136132 | A1 * | 6/2007 | Weiser et al. | 705/14 |
| 2008/0147493 | A1 * | 6/2008 | Aarnio | G06Q 30/02 |
| | | | | 705/14.64 |
| 2009/0029720 | A1 * | 1/2009 | Jaffe | G06Q 30/02 |
| | | | | 455/456.3 |

(Continued)

OTHER PUBLICATIONS

David Talbot, What Apple's M7 Motion-Sensing Chip Could Do, Sep. 25, 2013, 2 Pages.

(Continued)

*Primary Examiner* — David Stoltenberg
(74) *Attorney, Agent, or Firm* — Stetina Brunda Garred and Brucker

(57) ABSTRACT

The presentation of advertisements to a user on a mobile communications device is disclosed. A first external input corresponding to a triggering of an advertisement delivery is received on a first input modality. An advertisement overlay is displayed in a graphical user interface in response to receiving the external input. Advertisement invocation instructions are displayed within the advertisement overlay. A second external input is received on a second input modality different from the first input modality. The second external input is translated to a set of quantified values. An advertisement is then displayed within the advertisement overlay in response to a substantial match between the set of quantified values translated from the received second external input to the set of predefined values corresponding to the advertisement invocation instructions.

19 Claims, 8 Drawing Sheets

(56) References Cited

U.S. PATENT DOCUMENTS

| | | | |
|---|---|---|---|
| 2009/0319166 A1 | 12/2009 | Khosravy et al. | |
| 2010/0257475 A1 | 10/2010 | Smith et al. | |
| 2010/0269030 A1 | 10/2010 | Dugonjic et al. | |
| 2011/0173204 A1* | 7/2011 | Murillo et al. | 707/741 |
| 2011/0270679 A1 | 11/2011 | Tziortzis et al. | |
| 2011/0288913 A1* | 11/2011 | Waylonis | G06Q 30/0241 705/14.4 |
| 2012/0036003 A1* | 2/2012 | Tong | G06Q 30/0207 705/14.39 |
| 2012/0041767 A1 | 2/2012 | Hoffman et al. | |
| 2012/0131454 A1* | 5/2012 | Shah | G06F 3/04883 715/702 |
| 2012/0246596 A1 | 9/2012 | Ording et al. | |
| 2012/0265595 A1* | 10/2012 | Corner | G06Q 30/02 705/14.23 |
| 2012/0310717 A1* | 12/2012 | Kankainen | 705/14.4 |
| 2013/0166397 A1* | 6/2013 | Byun | G06Q 30/0277 705/14.73 |
| 2013/0211923 A1* | 8/2013 | Yuill | G06Q 30/0276 705/14.72 |
| 2013/0211924 A1* | 8/2013 | Yuill | G06Q 30/0277 705/14.72 |
| 2013/0218680 A1* | 8/2013 | Forsblom | G06Q 30/0261 705/14.58 |
| 2014/0278853 A1* | 9/2014 | Brown | G06Q 30/0209 705/14.12 |
| 2014/0282088 A1* | 9/2014 | Kakani | G06F 3/0484 715/753 |
| 2014/0316884 A1* | 10/2014 | Munisamy | G06Q 30/0251 705/14.49 |
| 2014/0344055 A1* | 11/2014 | Sanghavi | G06Q 30/0267 705/14.55 |
| 2015/0046247 A1* | 2/2015 | Rajappa | G06Q 30/0235 705/14.35 |
| 2015/0081448 A1* | 3/2015 | Osotio | G06Q 30/0269 705/14.66 |
| 2015/0095160 A1* | 4/2015 | Ma | G06Q 30/0267 705/14.64 |
| 2015/0120458 A1* | 4/2015 | Lee | G06Q 30/0262 705/14.59 |
| 2016/0292742 A1* | 10/2016 | Kang | G06F 3/04842 |

OTHER PUBLICATIONS

Chris Brandrick, Apple's M7 Chip is the Trojan Horse for Its Wearable Computing Plans, Sep. 13, 2013, 7 Pages.

International Search Report and Written Opinion for PCT/US14/69554; Mar. 6, 2015; 11 pages.

Olive Media Canada, Infiniti JX Tablet Advertisement by Olive Mobile, video, https://www.youtube.com/watch? v=KGIWebpdmYE#t=79, published May 29, 2012, 2 pages.

Rachel Lamb, Infiniti releases first touch-screen ad for JX, web page, http://www.luxurydaily.com/infinitireleasesfirsttouchscreenadforxj/, Jun. 7, 2012, 4 pages.

Leadbolt, LeadBolt Launches Industry's First and Only Mobile Ad Format to Utilize Gyroscope Technology, web page, http://www.businesswire.com/news/home/20131217005561/en/LeadBolt-Launches-Industry%E2%80%99s-Mobile-Ad-Format-Utilize, Dec. 17, 2013, 2 pages.

Medialets, Medialets Shakes Up Mobile Advertising, web page, https://www.medialets.com/medialetsshakesupmobileadvertising/, Apr. 22, 2009, 3 pages.

Forbes, Shaking Up Advertising, web page, http://www.forbes.com/2009/03/16dockersmobileadvertisingleadershipcmonetworkmobilemarketing.Html, Mar. 16, 2009, 4 pages.

Rebecca Borison, Tic Tac sees 7.94pc engagement rate with richmedia ad, web page, http://www.mobilemarketercom/cms/news/advertising/16631.html, Nov. 19, 2013, 4 pages.

Miedialets, World's First Shakable Ad™ by Medialets, video, https://www.youtube.com/watch?v=NwnuwGhcpRU, uploaded Apr. 11, 2009, 2 pages.

\* cited by examiner

MOTION AND GESTURE-BASED MOBILE ADVERTISING ACTIVATION

CROSS-REFERENCE TO RELATED APPLICATIONS

This application relates to and claims the benefit of U.S. Provisional Application No. 61/921,819 filed Dec. 30, 2013 and entitled "MOTION AND GESTURE BASED MOBILE AD ACTIVATION MECHANICS", the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to online services and user interfaces therefor, and more particularly, to motion and gesture-based mobile advertising activation.

2. Related Art

Conventional online media business practices involve providing information or services free of charge or at minimal cost to the primary audience in exchange for being presented with advertising that is paid for by advertisers. As referenced herein, online media or content providers encompasses the Internet counterparts of traditional television, radio, and print news and magazine outlets, as well as search engines and other such aggregators, social networking sites, individual websites/web logs (blogs) and the like. Advertising revenue is understood to offset the costs of server maintenance, network bandwidth, and other technical operational aspects, as well as the costs for producing the content itself, including pay for the authors, editors, and various other personnel involved in production. Similar practices have been extended to software applications, particularly those running on mobile devices, which can be provided free to the user but subsidized by advertising revenue.

Advertising content can be integrated with the presentation of the primary content (news articles, application functionality, etc.) in various ways. One of the most common is the banner ad, which is a graphic designed by the advertiser and placed in a prominent location within a content page. Several technical solutions that achieve this functionality are known in the art, such as embedding the banner advertisement in-line with the content but laid out on the top, side, or bottom ends of the page, displaying the banner advertisement in a separate static frame that does not move when scrolling, and so forth. Besides static graphics, animations, sound, video and different interactive elements can be also be integrated into the banner ad. Clicking on the banner advertisement typically directs the user to the advertiser's website, where additional information and an opportunity to purchase the advertised product can be provided.

Other advertising presentation techniques are also known in the art. These include pop-up windows, floating advertisements that are overlaid on the content until some additional interaction, such as pressing a close button, is completed, and interstitial ads, which require a reader to view an advertisement before being provided access to the content page. These techniques vary in terms of obtrusiveness and effectiveness, and varying forms of online advertising can be deployed depending on the desires of the content provider, the advertiser, and the user base.

As these conventional advertising presentations are utilized more, their ubiquity has slowly led to a decrease in their impact and effectiveness. Most end users tend to regard conventional advertisements as boring at best, and thus are ignored. In many cases, the advertisements may be annoying as interfering with the viewing of actual content. Further exacerbating this is that while the aforementioned conventional advertising presentation techniques were originally developed for viewing on browser platforms with ample screen real estate such as desktop and laptop computers, the user base of mobile devices such as smart phones has been expanding. Thus, an increasing number of users are browsing Internet websites and interacting with apps on mobile devices, and hence being presented with advertisements on limited screen real estate. Whether implemented on content websites or software apps, existing advertisement presentations require modifications to fit within the constraints of the mobile device interface. These factors are understood to increase the annoyance factor, and contribute to decreasing value of conventional online advertisements.

Accordingly, there is a need in the art for advertising presentations that involve more interactivity with the user, and is more engaging. There is also a need in the art for such advertising presentations to exploit the mobile device form factor and it ability to accept a variety of touch, gesture, and other types of inputs.

BRIEF SUMMARY

The present disclosure contemplates various methods for presenting advertisements to a user in a manner that increases interaction and takes advantage of the latest hardware and software features of the mobile communications device to make mobile advertising truly mobile. The method may begin with displaying content on a graphical user interface of the mobile communications device. An advertisement delivery sub-application may be embedded in the content. An activatable graphic element for the advertisement delivery sub-application may be displayed in-line with the content. The method may continue with receiving a first external input corresponding to a triggering of the activatable graphic element for the advertisement delivery sub-application. The first external input may be received on a first input modality of the mobile communications device. The method may further include displaying an advertisement overlay in the graphical user interface in response to receiving the first external input corresponding to the triggering of the activatable graphic element. The advertisement overlay may partially cover the content. Next, the method may proceed with displaying advertisement invocation instructions within the advertisement overlay. The method may also include receiving a second external input on a second input modality of the mobile communications device that is different from the first input modality. Furthermore, there may be a step of translating the second external input to at least a set of quantified values. The method may also include displaying an advertisement within the advertisement overlay in response to a substantial match between the set of quantified values translated from the received second external input to the a set of predefined values corresponding to the advertisement invocation instructions.

Another embodiment of the present disclosure is also directed to a method for presenting advertisements to a user on a mobile communications device. The method may include receiving a first external input corresponding to a triggering of an advertisement delivery. The first external input may be received on a first input modality of the mobile communications device. The method may also include displaying an advertisement overlay in a graphical user interface in response to receiving the external input corresponding to the triggering of the advertisement delivery. Furthermore, there may be a step of displaying advertisement invocation instructions within the advertisement overlay. The method may include receiving a second external input on a second input modality of the mobile communications device that is different from the first input modality. There may also be a step of translating the second external input to a set of quantified values. Finally, there method may include displaying an advertisement within the advertisement overlay in response to a substantial match between the set of quantified values translated from the received second external input to the set of predefined values corresponding to the advertisement invocation instructions.

Certain other embodiments of the present disclosure contemplate respective computer-readable program storage media that each tangibly embodies one or more programs of instructions executable by a data processing device to perform the foregoing methods. The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of methods for motion and gesture-based mobile advertising activation. The detailed description set forth below in connection with the appended drawings is intended as a description of the several presently contemplated embodiments of these methods, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
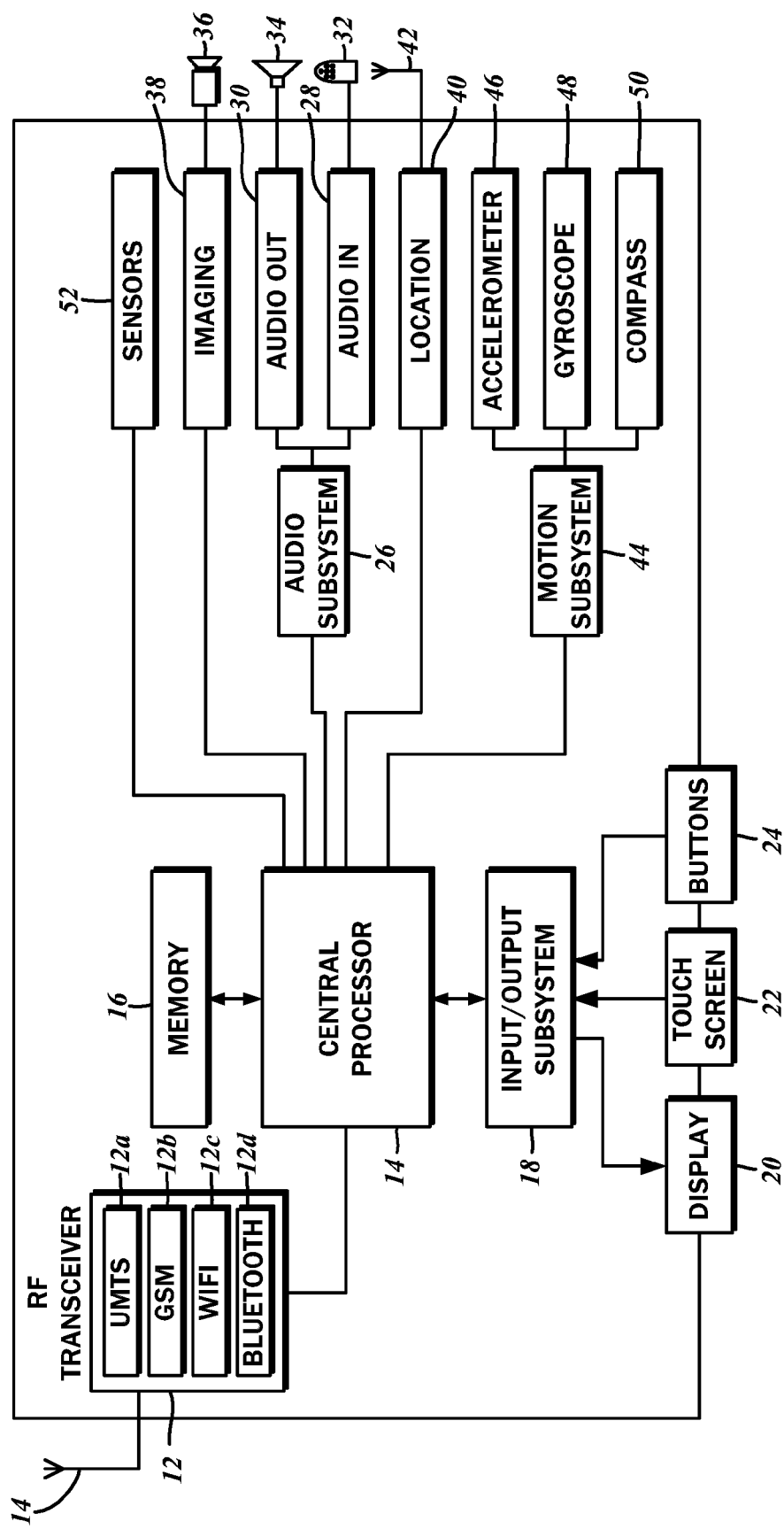
FIG. 1 is a block diagram illustrating the components of a mobile communications device utilized in various embodiments of the present disclosure.

FIG. 1 illustrates one exemplary mobile communications device 10 on which various embodiments of the present disclosure may be implemented. The mobile communications device 10 may be a smartphone, and therefore include a radio frequency (RF) transceiver 12 that transmits and receives signals via an antenna 14. Conventional devices are capable of handling multiple wireless communications modes simultaneously. These include several digital phone modalities such as UMTS (Universal Mobile Telecommunications System), 4G LTE (Long Term Evolution), and the like. For example, the RF transceiver 12 includes a UMTS module 12a. To the extent that coverage of such more advanced services may be limited, it may be possible to drop down to a different but related modality such as EDGE (Enhanced Data rates for GSM Evolution) or GSM (Global System for Mobile communications), with specific modules therefor also being incorporated in the RF transceiver 12, for example, GSM module 12b. Aside from multiple digital phone technologies, the RF transceiver 12 may implement other wireless communications modalities such as WiFi for local area networking and accessing the Internet by way of local area networks, and Bluetooth for linking peripheral devices such as headsets. Accordingly, the RF transceiver may include a WiFi module 12c and a Bluetooth module 12d. The enumeration of various wireless networking modules is not intended to be limiting, and others may be included without departing from the scope of the present disclosure.

The mobile communications device 10 is understood to implement a wide range of functionality through different software applications, which are colloquially known as "apps" in the mobile device context. The software applications are comprised of pre-programmed instructions that are executed by a central processor 14 and that may be stored on a memory 16. The results of these executed instructions may be output for viewing by a user, and the sequence/parameters of those instructions may be modified via inputs from the user. To this end, the central processor 14 interfaces with an input/output subsystem 18 that manages the output functionality of a display 20 and the input functionality of a touch screen 22 and one or more buttons 24.

In a conventional smartphone device, the user primarily interacts with a graphical user interface that is generated on the display 20 and includes various user interface elements that can be activated based on haptic inputs received on the touch screen 22 at positions corresponding to the underlying displayed interface element. One of the buttons 24 may serve a general purpose escape function, while another may serve to power up or power down the mobile communications device 10. Additionally, there may be other buttons and switches for controlling volume, limiting haptic entry, and so forth. Those having ordinary skill in the art will recognize other possible input/output devices that could be integrated into the mobile communications device 10, and the purposes such devices would serve. Other smartphone devices may include keyboards (not shown) and other mechanical input devices, and the presently disclosed interaction methods with the graphical user interface detailed more fully below are understood to be applicable to such alternative input modalities.

The mobile communications device 10 includes several other peripheral devices. One of the more basic is an audio subsystem 26 with an audio input 28 and an audio output 30 that allows the user to conduct voice telephone calls. The audio input 28 is connected to a microphone 32 that converts sound to electrical signals, and may include amplifier and ADC (analog to digital converter) circuitry that transforms the continuous analog electrical signals to digital data. Furthermore, the audio output 30 is connected to a loudspeaker 34 that converts electrical signals to air pressure waves that result in sound, and may likewise include amplifier and DAC (digital to analog converter) circuitry that transforms the digital sound data to a continuous analog electrical signal that drives the loudspeaker 34. Furthermore, it is possible to capture still images and video via a camera 36 that is managed by an imaging module 38.

Due to its inherent mobility, users can access information and interact with the mobile communications device 10 practically anywhere. Additional context in this regard is discernible from inputs pertaining to location, movement, and physical and geographical orientation, which further enhance the user experience. Accordingly, the mobile communications device 10 includes a location module 40, which may be a Global Positioning System (GPS) receiver that is connected to a separate antenna 42 and generates coordinates data of the current location as extrapolated from signals received from the network of GPS satellites. Motions imparted upon the mobile communications device 10, as well as the physical and geographical orientation of the same, may be captured as data with a motion subsystem 44, in particular, with an accelerometer 46, a gyroscope 48, and a compass 50, respectively. Although in some embodiments the accelerometer 46, the gyroscope 48, and the compass 50 directly communicate with the central processor 14, more recent variations of the mobile communications device 10 utilize the motion subsystem 44 that is embodied as a separate co-processor to which the acceleration and orientation processing is offloaded for greater efficiency and reduced electrical power consumption. One exemplary embodiment of the mobile communications device 10 is the Apple iPhone with the M7 motion co-processor.

The components of the motion subsystem 44, including the accelerometer 46, the gyroscope 48, and the compass 50, while shown as integrated into the mobile communications device 10, may be incorporated into a separate, external device. This external device may be wearable by the user and communicatively linked to the mobile communications device 10 over the aforementioned data link modalities. The same physical interactions contemplated with the mobile communications device 10 to invoke various functions as discussed in further detail below may be possible with such external wearable device.

There are other sensors 52 that can be utilized in the mobile communications device 10 for different purposes. For example, one of the other sensors 52 may be a proximity sensor to detect the presence or absence of the user to invoke certain functions, while another may be a light sensor that adjusts the brightness of the display 20 according to ambient light conditions. Those having ordinary skill in the art will recognize that other sensors 52 beyond those considered herein are also possible.

With reference to the flowchart of FIG. 2, one embodiment of a method for presenting advertisements to the user on the mobile communications device 10 will be described. As shown in FIG. 3, there is a graphical user interface 54 of an app running on the mobile communications device. By way of example only and not of limitation, the app involves sharing/viewing photographs, and within a main screen area 56 there may be a plurality of content panels 58 within which a picture or content 60 is rendered. Thus, the method begins with a step 200 of displaying the content 60 on the graphical user interface 54. Scrolling upwards or downwards according to standard touch input navigation reveals additional content panels 58 with different pictures. Although photo sharing/viewing app is depicted, it will be appreciated that any other type of content may be presented in a similar manner, such as news and blog articles and so forth.

In further detail, on the upper right hand corner of the content panel 58, there is an activatable graphic element 62 that is a part of an advertisement delivery sub-application embedded within the content 60. As referenced broadly herein, the term embedded with respect to the advertisement delivery sub-application may mean an executable or scripted module that is incorporated into the underlying app, a single instruction or reference that invokes the functionality of the advertisement delivery sub-application, or any other modality of calling a separate set of instructions that perform the function of advertisement delivery as contemplated. In order for the user to continue to experience the underlying app and/or content in the same manner as before, any other suitable unobtrusive location within the graphical user interface 54 that indicates an advertisement is available to be viewed can be substituted.

Continuing on, the method includes a step 202 of receiving a first external input corresponding to a triggering of the activatable graphic element 62 of the advertisement delivery sub-application. The first external input is received on a first input modality. In the context of the mobile communications device 10 with a touch user interface, this refers to receiving a haptic contact on the touch screen 22 at a location corresponding in position to the displayed activatable graphic element 62. Other ways of providing the same input are also possible.

Figure 4:
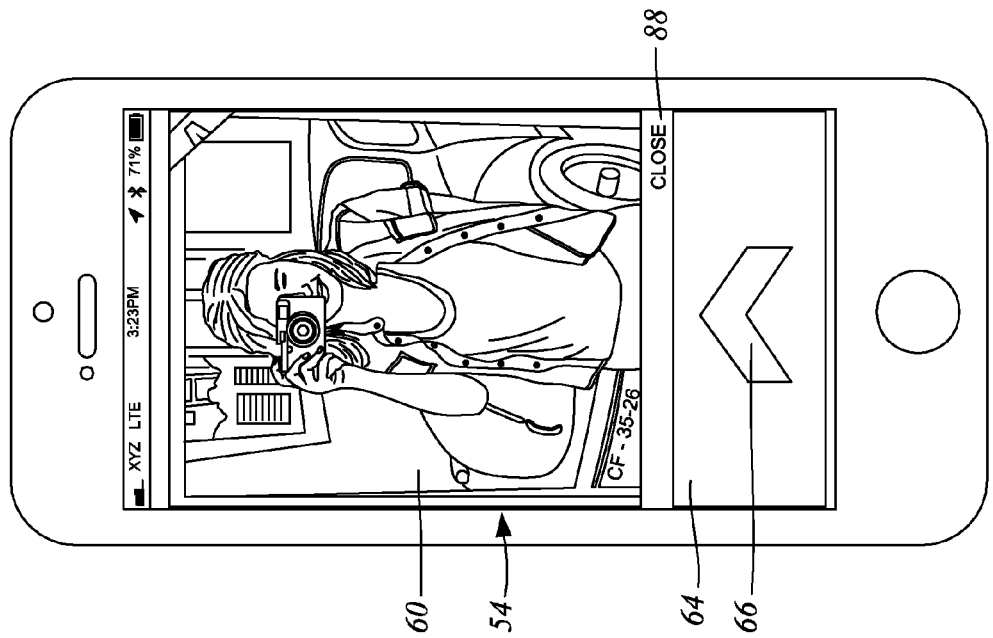
FIG. 4 shows the graphical user interface displaying an advertising overlay.

As best shown in FIG. 4, and in accordance with a step 204, an advertisement overlay 64 is displayed on the graphical user interface 54 in response to the foregoing receipt of the first external input that corresponds to the triggering of the activatable graphic element 62. According to various embodiments, the advertisement overlay 64 at least partially covers the content 60. An animation effect may be utilized to bring the advertisement overlay 64 into view. One example of such an animation effect may be gradually raising the advertisement overlay 64 from the bottom of the graphical user interface 54. Simultaneously, the content panels 58 can be faded into the background by darkening the same via another animation effect. Other effects that subdue the content panels 58 may also be utilized. To indicate to the user that additional content to be shown within the advertisement overlay 64 is forthcoming. A transition graphic 66 may be displayed as the animation effect of the advertisement overlay 64 progresses.

Although the step 204 of displaying the advertisement overlay 64 has been described in the context of one embodiment in which the step is responsive to receiving the first external input that triggers the activatable graphic element 62, alternative embodiments are not limited thereto. For example, the advertisement overlay 64 may be displayed in response to a first external input that is independent of the graphical user interface 54 and any user interactions therewith. The first input modality of the mobile communications device 10 could be an indoor positioning system (beacon) receiver. Upon receiving a signal from an indoor positioning system transmitter by virtue of the mobile communications device 10 being brought in proximity thereto where such reception becomes possible, it is evaluated as such. In this case, the first external input could be the receipt of the beacon signal. Similarly, establishing a network link over particular wireless local area networks, being in a particular location as detected by the location module 40, being in a location with a particular type of weather reported, and so forth, can invoke the display of the advertisement overlay 64. Additional context can be discerned from nearby connected devices such as thermostats, televisions, lights, door locks, vehicles, and the like. Furthermore, the interaction with the graphical user interface as in the previously described embodiment could be combined with location triggering to further refine the type of advertisements that are presented to the user.

Figure 5:
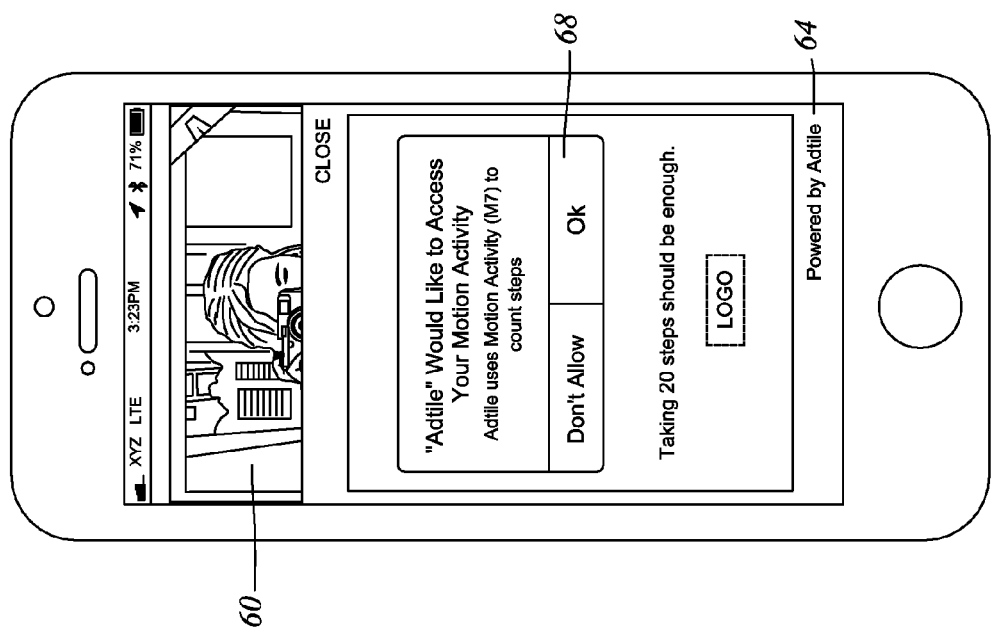
FIG. 5 shows the graphical user interface displaying a consent screen prior to accessing a motion subsystem of the mobile communications device for the first time.

The present disclosure contemplates the invocation of advertisements in response to various motion/gesture inputs applied to the mobile communications device 10 by the user. Such inputs are detected, measured, and quantified by the motion subsystem 44. The conventions of certain mobile communications devices 10 dictate obtaining consent from the user prior to the use of this data due to privacy concerns. As shown in FIG. 5, a system-generated consent screen 68 is displayed over the advertisement overlay 64 as well as the content 60 if it is the first time the motion subsystem 44 is being accessed from the underlying app. When consent is provided, subsequent accesses to the motion subsystem 44 do not require further confirmation from the user.

Figure 2:
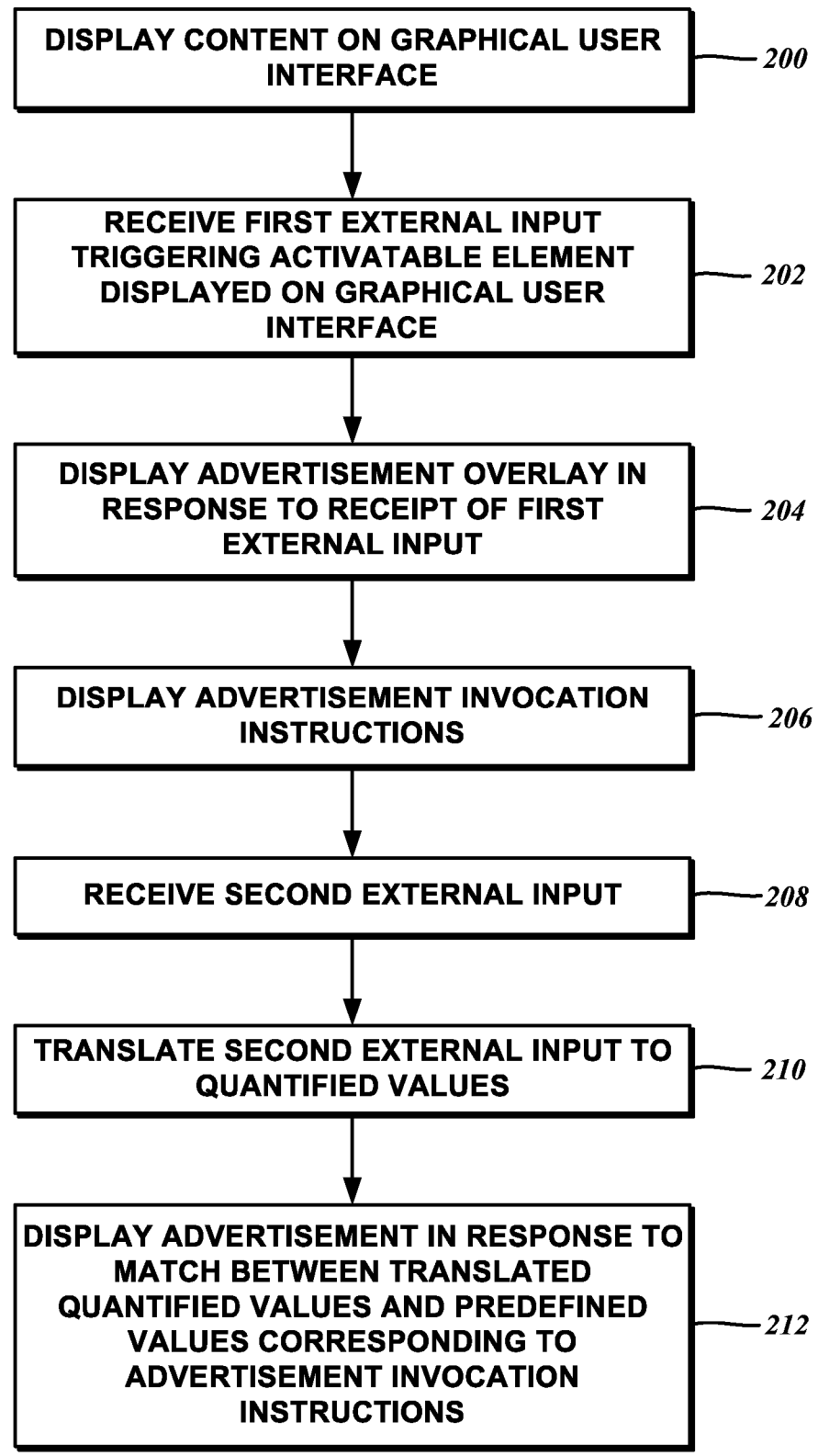
FIG. 2 is a flowchart illustrating an embodiment of a method for presenting advertisements to a user on a mobile communications device.
Figure 3:
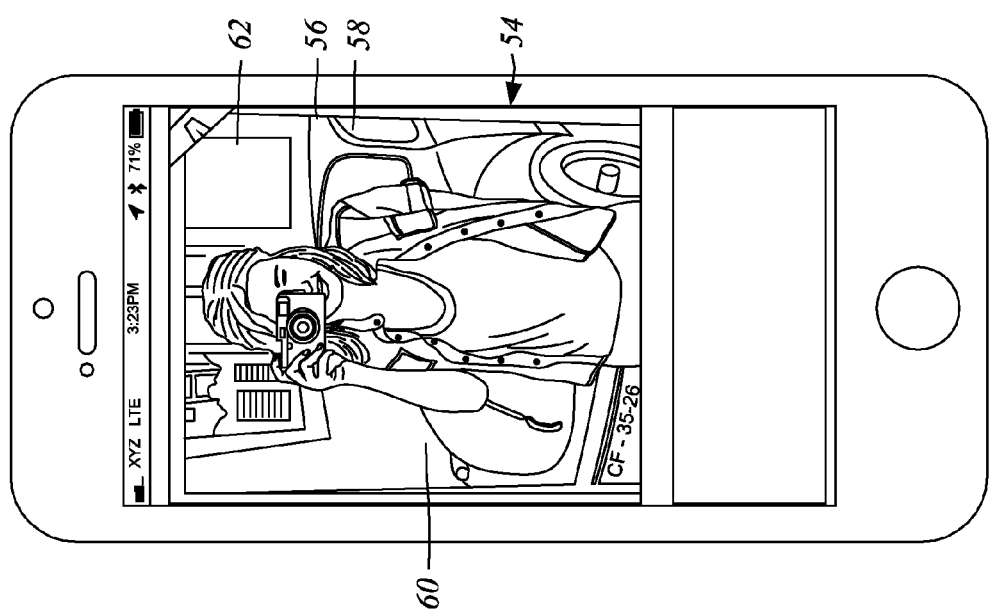
FIG. 3 is an example graphical user interface of an app running on the mobile communications device.
Figure 6:
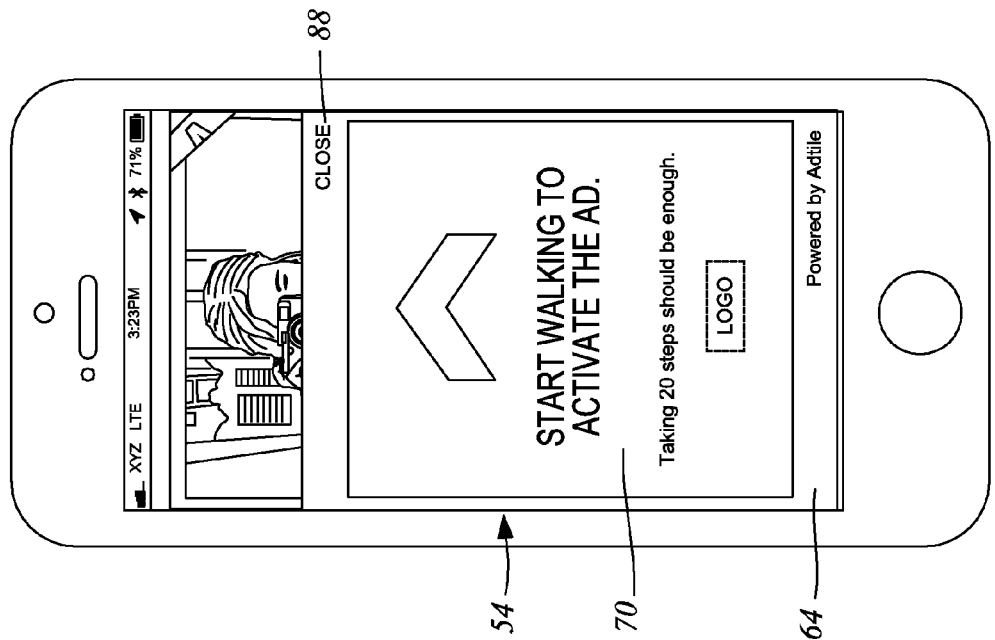
FIG. 6 shows the graphical user interface displaying advertisement invocation instructions.
Figure 7:
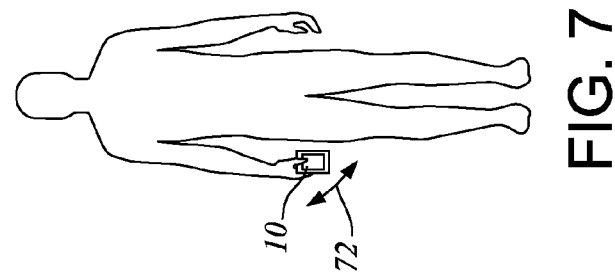
FIG. 7 is a user imparting a motion on the mobile communications device by walking.

Referring again to the flowchart of FIG. 2, as well as to the example graphical user interface shown in FIG. 6, the method for presenting advertisements to the user continues with a step 206 of displaying advertisement invocation instructions 70 within the advertisement overlay 64. In other words, the user is prompted as to what motion or gesture action to perform in order to display the advertisement. The advertisement invocation instructions 70 as shown in FIG. 6 prompt the user to start walking. An additional hint as to how many steps are necessary to so invoke the advertisement, e.g. twenty steps, may also be displayed. The user begins walking as shown in FIG. 7, and the motion subsystem 44 detects the motion 72 imparted on the mobile communications device 10 and receives this as a second external input in accordance with a step 208. It was mentioned above that in certain embodiments, the haptic contact on the touch screen 22 constituted the first external input. In this regard, this second external input on the motion subsystem 44, that is, one or a combination of the accelerometer 46, the gyroscope 48, and the compass 50, is understood to be different from such first external input and the input modalities involved therewith.

Figure 8:
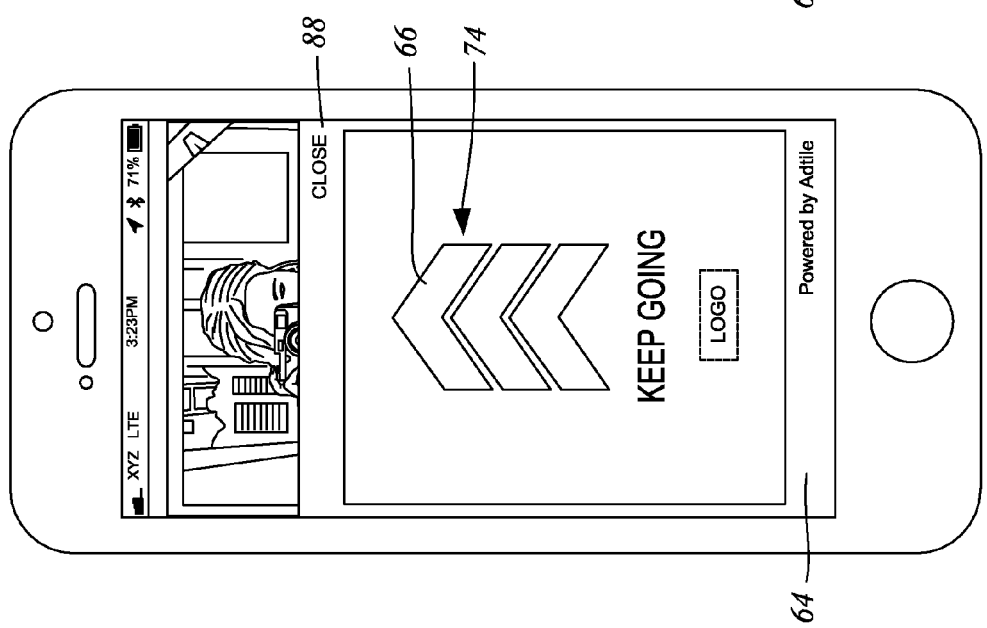
FIG. 8 shows the graphical user interface displaying a progress indicator.

The captured second external input is thereafter translated to at least a set of quantified values in accordance with step 210. The second external input could be one set of data captured in one time instant as would be the case for direction and orientation, or it could be multiple sets of data captured over multiple time instances that represent a movement action. Where multiple sets of data are required to detect an action from the user, a progress indicator towards the completion thereof may be displayed on the advertisement overlay 64. FIG. 8 depicts one such exemplary progress indicator 74 that also instructs the user to "keep going." With each step that is detected, another animation effect may be applied to the transition graphic 66 that indicates the same to the user. The progress indicator 74 is updated during the step of receiving the second external input, and so these processes are understood to occur concurrently. None of the steps of the method disclosed herein should be deemed to require sequential execution.

Figure 9:
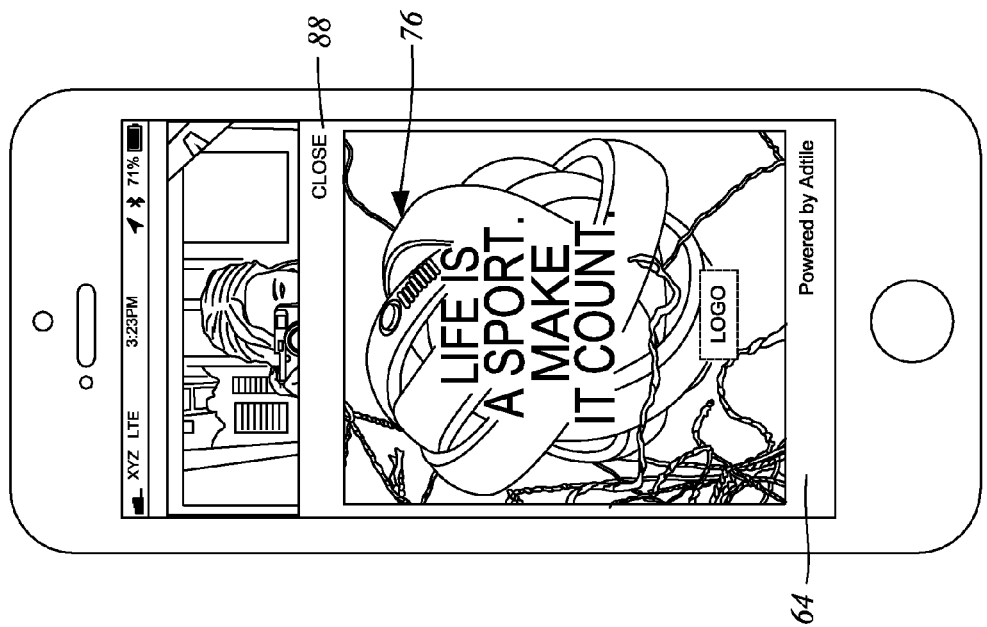
FIG. 9 shows the graphical user interface displaying an advertisement after the user has provided the input therefor.

With additional reference to FIG. 9, the method for presenting advertisements continues with a step 212 of displaying an advertisement 76 within the advertisement overlay 64. This step takes place in response to a substantial match between the set of quantified values translated from the received second external input, e.g., the motion 72, to a set of predefined values corresponding to the advertisement invocation instruction 70. In further detail, the set of predefined values is understood to include data that would be measured by the accelerometer 46, and is known to be correlated to the user walking with the mobile communications device 10. Within a predetermined threshold of such data, if the set of quantified values translated from the second external input as measured by the same accelerometer 46 is matching, then it is determined that the user was walking. Various algorithms to determine such matches are known in the art, and any one can be substituted without departing from the scope of the present disclosure.

The display of the advertisement 76 need not be static, and may be modified according to other inputs being concurrently provided to the mobile communications device 10. For instance, a different graphic may be displayed in instances where the mobile communications device 10 is truly stationary, versus instances where the mobile communications device 10 is stationary but within a moving object such as a train, automobile, and the like. Where animated graphics are used as the advertisement 76, the playback speed can also be adjusted depending on the circumstances.

Figure 11:
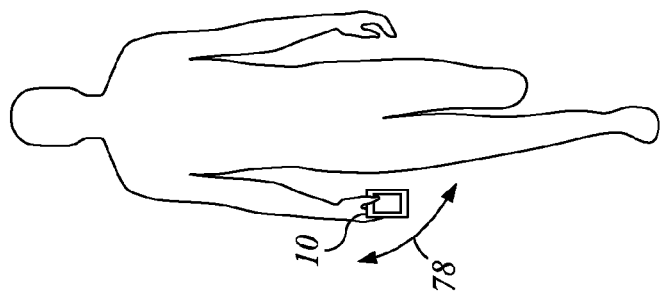
FIG. 11 is a user imparting a motion on the mobile communications device by running.
Figure 10:
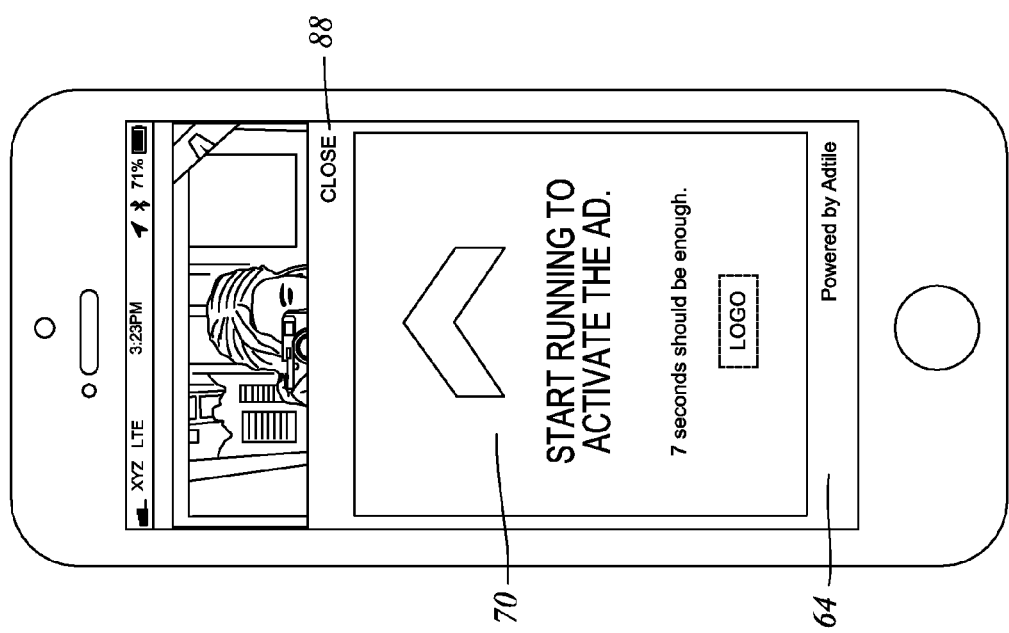
FIG. 10 shows the graphical user interface displaying a variation of the advertisement invocation instructions directing the user to run.

Other types of gestures and motions that can be imparted on the mobile communications device 10 by the user are also contemplated. For example, FIG. 10 illustrates the advertisement invocation instructions 70 directing the user to begin running. By way of the user so running with the mobile communications device 10 as shown in FIG. 11, another motion 78 is imparted. The set of quantified values may have a greater magnitude than the walking motion 72, but similarly defined by measurements read from the accelerometer 46. Again, these readings can be compared to predefined values that are known to correlate to a running motion. When there is a match, the advertisement 76 can be displayed as described above.

Figure 13:
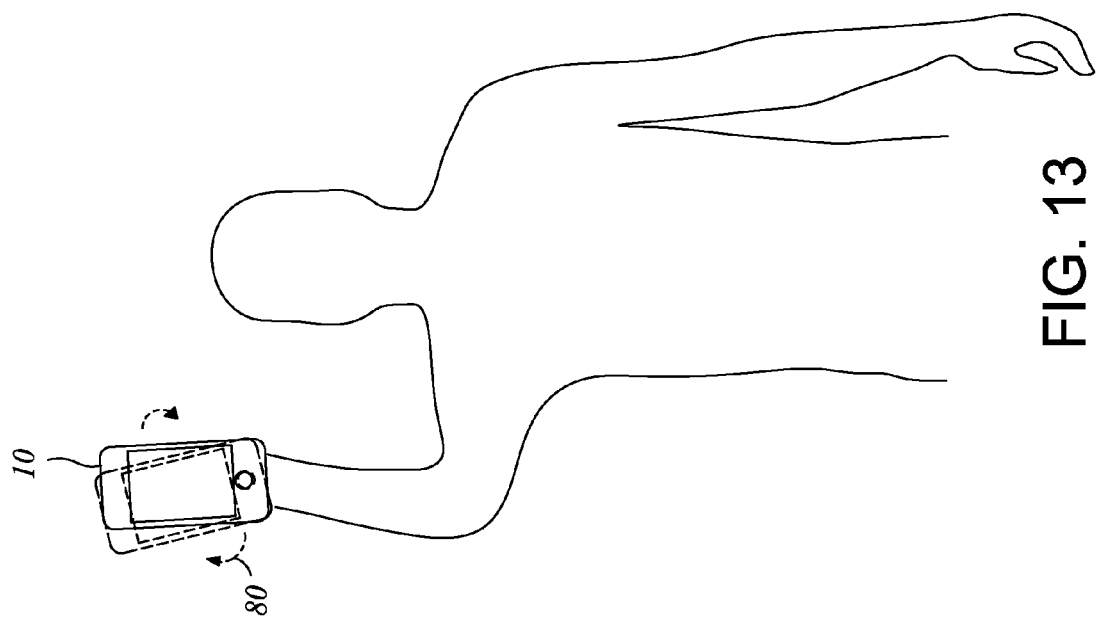
FIG. 13 is a user imparting another motion on the mobile communications device as instructed in FIG. 10.
Figure 12:
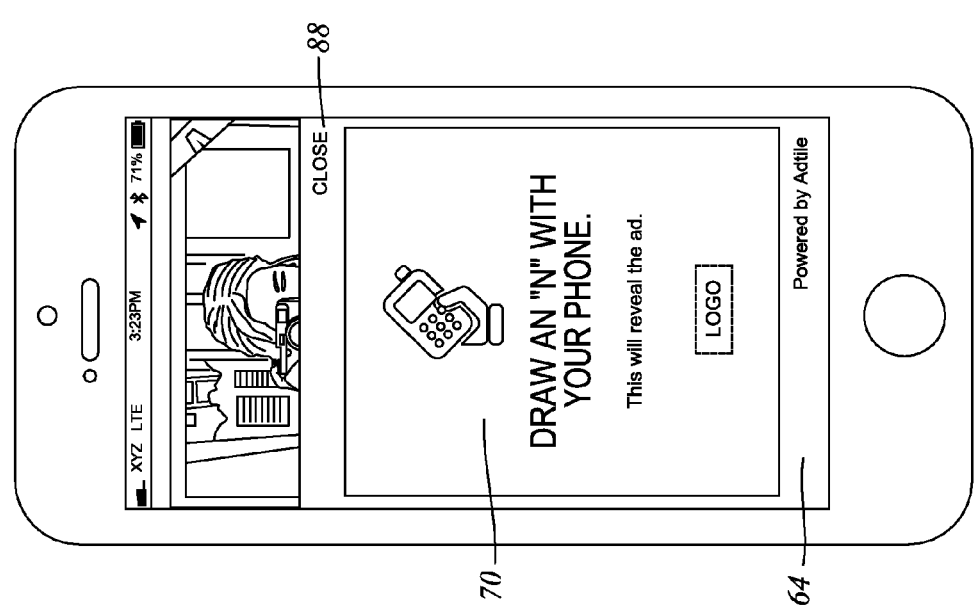
FIG. 12 shows the graphical user interface displaying another variation of the advertisement invocation instructions directing the user to input a gesture of a letter to display the advertisement.

FIG. 12 shows the advertisement invocation instructions 70 for yet another different gesture/motion that can be imparted on the mobile communications device 10 to invoke the advertisement 76. FIG. 13 illustrates the mobile communications device 10 being moved accordingly, per motion 80. In the illustrated example, the user is directed to draw an alphabet character "N," which may be related to the advertiser's branding. Along these lines, the particular gestures and motions requested can relate in this manner to the advertiser. For example, a running action can be suitable for advertisers that sell athletic goods, while a shaking motion could be appropriate for juice bars, and so forth. Those having ordinary skill in the art will recognize suitable matching of a given advertiser with appropriate gestures. These gestures may be more accurately measured by the gyroscope 48, or a combination of the gyroscope 48 and the accelerometer 46.

Figure 14:
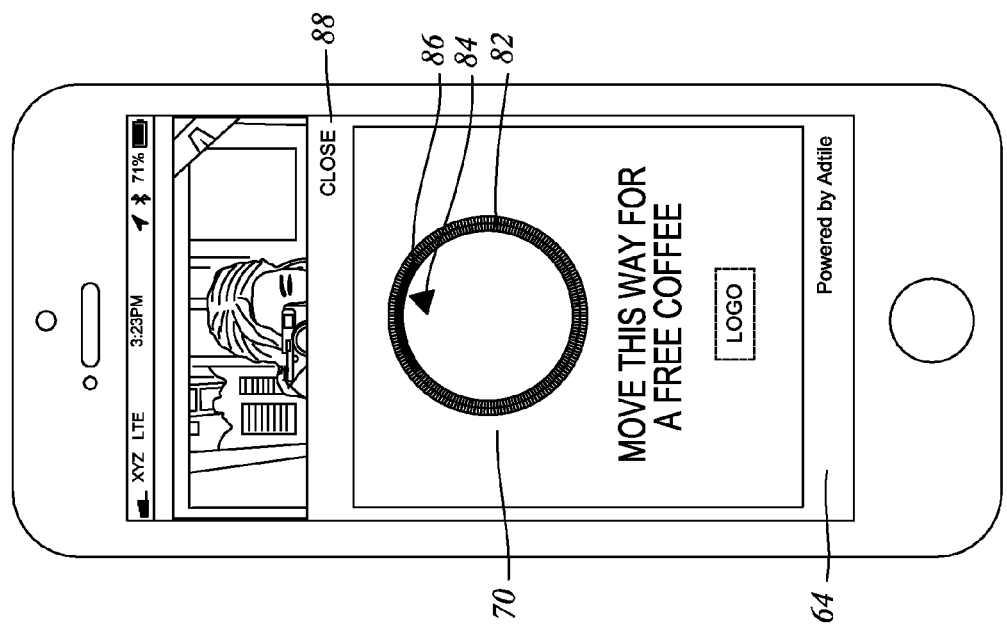
FIG. 14 shows the graphical user interface displaying yet another variation of the advertisement invocation instructions directing the user to face and walk a certain direction to display the advertisement.

Yet another motion/gesture can be requested as shown in the advertisement invocation instructions 70 of FIG. 14. In particular, this prompts the user to face and walk in a certain direction. There is a directional indicator 82 that shows a current direction 84 and a guided direction 86 that corresponds to a predetermined direction set by the advertiser. The direction measurements are understood to be made by the compass 50, and in this example, additional readings from the gyroscope 48 and/or the accelerometer 46 can be used to determine whether the user is walking in the direction as prompted by the advertisement invocation instructions 70. One possible use for this feature may be to direct the user to the nearest retail branch of the advertiser. These motions can be coupled with granting incentives such as free goods/services when the user complies with the prompted advertisement invocation instructions. In the illustrated example of a coffee chain, walking in a direction toward the closest branch may yield a free coffee coupon. Other types of incentives, coupons, and free items could be offered in exchange for performing the actions prompted in the advertisement invocation instructions 70, including contest entries for more expensive items also offered by the advertiser.

The foregoing examples illustrate that multiple inputs to the motion subsystem 44 can be used in sequence to correlate various actions by the user. However, it is also possible to utilize and prompt for single actions.

Figure 15:
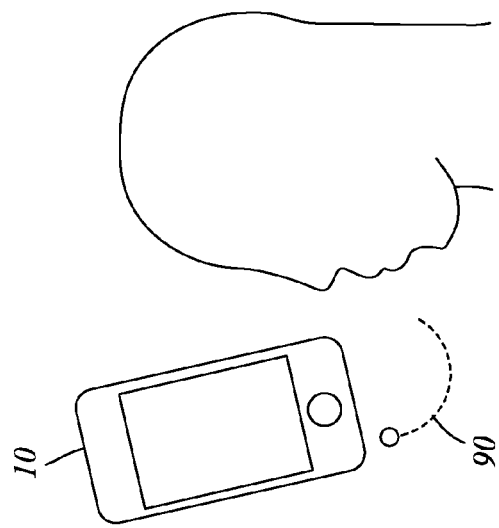
FIG. 15 is a user inputting voice to the mobile communications device to invoke an advertisement.

Although the previous advertisement invocation instructions 70 each involved a motion or gesture that is measured by the motion subsystem 44, it is possible to use the other inputs of the mobile communications device 10 to similarly activate the advertisement 76. For example, FIG. 15 illustrates the user providing a voice input 90 to the audio subsystem 26. One possible advertisement invocation instruction 70 may prompt the user to "say brand name to activate the ad." With the on-board voice recognition capabilities, a match of the user speaking the brand name can be used to display the advertisement 76. Another possible advertisement invocation instruction 70 may prompt the user to input a facial gesture (e.g., a smile) that is captured by the camera 36. Hand gestures that can be captured as a sequence of images can also be used to display the advertisement 76.

As indicated above, the outputs generated throughout the steps of the method are all within the advertisement overlay 64, and designed to complement the native environment. Thus, it is possible to show the instructions, receive the input, and display the advertisement within the same main screen area 56 of the underlying app, without the need for leaving or exiting out of the same. Along these lines, whenever the advertisement overlay 64 is displayed, the user has the option to close the same and return to the underlying app by tapping a close button 88. The familiar entertainment and discovery that the user has come to expect from the app are still readily accessible, as the underlying app continues to run in the background. It is contemplated that advertisers will be able to attain superior brand engagements and drive messaging that imaginatively involves the user on a deeper level.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A graphical user interface for presenting advertisements to a user on a display of a mobile communications device, the graphical user interface comprising:
   a display of a mobile communications device;
   a first graphical user interface window for displaying content on the display of the mobile communications device, wherein an advertisement delivery sub-application is embedded in the content, wherein an activatable graphic element for the advertisement delivery sub-application is displayed in-line with the content, the activatable graphic element providing an indication to the user that an advertisement is available to be viewed upon a request by the user;
   a second graphical user interface window configured to partially cover the first graphical user interface window in response to the request by the user to display the advertisement, wherein the request by the user is a first external input received on a first input modality of the mobile communications device, the first external input corresponding to a triggering of the activatable graphic element for the advertisement delivery sub-application;
   wherein the second graphical user interface window displays advertisement invocation instructions prompting the user to provide a second external input in response to receiving the first external input corresponding to the triggering of the activatable graphic element; and
   wherein, while receiving a second external input on a second input modality of the mobile communications device different from the first input modality at the prompting of the user, the second graphical user interface window displays an input progress indicator, and after receiving the second external input, the second graphical user interface window displays the advertisement separate from the advertisement invocation instructions upon an evaluation of a substantial match between a set of quantified values translated from the second external input to a set of predefined values corresponding to the advertisement invocation instructions.

2. The graphical user interface of claim 1, wherein:
   the first input modality is a touch screen; and
   the first external input is a haptic contact upon the touch screen from the user corresponding in position to the displayed activatable graphic element.

3. The graphical user interface of claim 1, wherein the second input modality is at least one of an accelerometer, compass, and gyroscope.

4. The graphical user interface of claim 3, wherein:
   the at least one of the accelerometer, compass, and gyroscope is embedded in the mobile communications device; and
   the second external input is a sequence of motions applied to the mobile communications device by the user that are translated to the set of quantified values by the at least one of the accelerometer, compass, and gyroscope.

5. The graphical user interface of claim 3, wherein:
   the at least one of the accelerometer, compass, and gyroscope is embedded in an external device wearable by the user and in communication with the mobile communications device; and the second external input is a sequence of motions applied to the external device by the user that are translated to the set of quantified values by the at least one of the accelerometer, compass, and gyroscope.

6. The graphical user interface of claim 3, wherein the second external input is steps walked by the user as measured by the accelerometer.

7. The graphical user interface of claim 3, wherein the second external input is steps ran by the user as measured by the accelerometer.

8. The graphical user interface of claim 3, wherein the second external input is a physical gesture as measured by the gyroscope.

9. The graphical user interface of claim 3, wherein the second external input is a direction as measured by the compass.

10. The graphical user interface of claim 3, wherein the second external input is steps walked in a defined direction as measured by a combination of the accelerometer and the compass.

11. The graphical user interface of claim 1, wherein:
the second input modality is an on-board microphone; and
the second external input is a sequence of audio commands generated by the user and captured by the on-board microphone.

12. The graphical user interface of claim 1, wherein:
the second input modality is an on-board camera; and
the second external input is a sequence of user gestures graphically captured by the on-board camera.

13. The graphical user interface of claim 12, wherein the gestures are graphically captured from a face of the user.

14. The graphical user interface of claim 12, wherein the gestures are graphically captured from a hand of the user.

15. The graphical user interface of claim 1, wherein the second external input is translated to multiple sets of quantified values each corresponding to a different time instant.

16. A mobile communications device, comprising:
a processor having a memory associated therewith;
an input/output interface associated with the processor;
a display associated with the input/output interface; and
a motion subsystem associated with the processor, wherein the motion subsystem is capable of detecting motions imparted to the mobile communications device;
wherein the memory is encoded with an advertisement delivery application that when executed on the processor is capable of displaying advertisements on the display based on motions imparted to the mobile communications device by performing the operations of:
providing a graphical user interface on the display via the input/output interface;
displaying content on the graphical user interface, an advertisement delivery sub-application being embedded in the content, with an activatable graphic element of the advertisement delivery sub-application being displayed in-line with the content, the activatable graphic element providing an indication to a user that an advertisement is available to be viewed upon a request by the user;
receiving the request by the user to display the advertisement, the request by the user being a first external input corresponding to a triggering of the activatable graphic element, the first external input being received on a first input modality of the mobile communications device;
displaying an advertisement overlay in the graphical user interface partially covering the content in response to receiving the first external input corresponding to the triggering of the advertising delivery, with advertisement invocation instructions being displayed within the advertisement overlay for prompting user action;
prompting the user to provide a sequence of second external inputs with the advertisement invocation instructions displayed within the advertising overlay;
receiving a sequence of second external inputs on a second input modality of the mobile communications device different from the first input modality at the prompting of the user to provide the sequence of second external inputs after the first external input corresponding to the triggering of the advertisement delivery is received;
displaying a sequence input progress indicator during the receiving of the sequence of external inputs, the sequence input progress indicator being incrementally updated in response to one or more partial sequences of the sequence of external inputs matching a predefined condition;
translating the sequence of second external inputs to a set of quantified values; and
displaying, within the advertisement overlay, an advertisement separate from the advertisement invocation instructions upon an evaluation of a substantial match between the set of quantified values translated from the received sequence of second external inputs to a set of predefined values corresponding to the advertisement invocation instructions.

17. A method for presenting advertisements to a user on a mobile communications device, the method comprising the ordered steps of:
displaying content on a graphical user interface of the mobile communications device, an advertisement delivery sub-application being embedded in the content, with an activatable graphic element of the advertisement delivery sub-application being displayed in-line with the content, the activatable graphic element providing an indication to the user that an advertisement is available to be viewed upon a request by the user;
receiving a user input indicative of the request by the user to display the advertisement, the user input corresponding to a triggering of the activatable graphic element of the advertisement delivery sub-application;
displaying an advertisement overlay in the graphical user interface partially covering the content in response to receiving the user input corresponding to the triggering of the activatable graphic element;
prompting the user to impart physical motions to the mobile communications device with advertisement invocation instructions displayed within the advertisement overlay;
receiving a sequence of external inputs corresponding to physical motions imparted on the mobile communications device at the prompting of the user while the advertisement invocation instructions are being displayed within the advertisement overlay;
displaying a sequence input progress indicator during the receiving of the sequence of external inputs, the sequence input progress indicator being incrementally updated in response to one or more partial sequences of the sequence of external inputs matching a predefined condition;

translating the sequence of external inputs to at least a set of quantified values; and displaying, within the advertisement overlay, an advertisement separate from the advertisement invocation instructions upon an evaluation of a substantial match between the set of quantified values translated from the received sequence of external inputs to a set of predefined values corresponding to the advertisement invocation instructions.

18. A method for presenting advertisements to a user on a mobile communications device, the method comprising the ordered steps of:

displaying on the mobile communications device an activatable graphic element on a graphical user interface of the mobile communications device in a first state, the activatable graphic element providing an indication to the user that an interactive advertisement is available to be viewed upon a request by the user;

receiving a user input indicative of the request by the user to invoke the interactive advertisement while in the first state, the user input corresponding to a triggering of the activatable graphic element;

transitioning the mobile communications device to a second state in response to receiving the user input;

displaying an advertisement overlay in the graphical user interface of the mobile communications device while in the second state;

prompting the user to impart a sequence of motion inputs to the mobile communications device with instructions displayed within the advertisement overlay while in the second state;

activating an on-board motion sensor on the mobile communications device while in the second state and the user is being prompted to impart the sequence of motion inputs to the mobile communications device;

detecting a first sub-sequence of motion inputs with the activated on-board motion sensors while in the second state;

generating a first set of motion input data from the detected first sub-sequence of motion inputs;

incrementing a progress indicator displayed on the advertising overlay in response to the first set of motion input data matching predefined requested motion input values at least partially corresponding to the sequence of motion inputs.

19. The method of claim 18, further comprising:

transitioning the mobile communications device to a third state in response to an accumulated sequence of motion inputs as defined by a plurality of sets of motion input data matching a predefined input completion condition; and generating a completion advertisement in the advertising overlay.

* * * * *